US012388724B2

United States Patent
Kochiev et al.

(10) Patent No.: US 12,388,724 B2
(45) Date of Patent: Aug. 12, 2025

(54) NETWORK DEGRADATION PREDICTION

(71) Applicant: T-Mobile Innovations LLC, Overland Park, KS (US)

(72) Inventors: Timur Kochiev, Irvine, CA (US); Ariz Jacinto, Bellevue, WA (US); Xiao Zhang, Sammamish, WA (US); Mana Mehraein, Seattle, WA (US); Andreas Thomas Hindman, Redmond, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 0 days.

(21) Appl. No.: 17/893,482

(22) Filed: Aug. 23, 2022

(65) Prior Publication Data

US 2024/0073107 A1 Feb. 29, 2024

(51) Int. Cl.
*H04L 41/5009* (2022.01)
*H04L 41/0631* (2022.01)
*H04L 41/16* (2022.01)

(52) U.S. Cl.
CPC ...... *H04L 41/5009* (2013.01); *H04L 41/0631* (2013.01); *H04L 41/16* (2013.01)

(58) Field of Classification Search
CPC .. H04L 41/5009; H04L 41/0631; H04L 41/16
See application file for complete search history.

(56) References Cited

U.S. PATENT DOCUMENTS

| | | | |
|---|---|---|---|
| 2007/0021116 A1* | 1/2007 | Okita | H04W 24/02 455/560 |
| 2009/0119655 A1* | 5/2009 | Quilty | H04W 24/04 717/168 |
| 2014/0141768 A1* | 5/2014 | Javaid | G06F 11/3452 455/423 |
| 2015/0195721 A1* | 7/2015 | Costelloe | H04W 24/04 455/425 |
| 2016/0127912 A1* | 5/2016 | Markwart | H04W 64/00 455/447 |
| 2017/0118700 A1* | 4/2017 | Lee | H04W 48/20 |
| 2017/0180188 A1* | 6/2017 | Satpathy | H04W 4/80 |
| 2018/0324032 A1* | 11/2018 | Yamine | H04W 24/04 |
| 2018/0367941 A1* | 12/2018 | Kwong | H04L 43/045 |
| 2019/0171438 A1* | 6/2019 | Franchitti | G06N 3/08 |
| 2019/0182105 A1* | 6/2019 | Stephens | H04L 67/125 |
| 2019/0273663 A1* | 9/2019 | Balmakhtar | H04L 41/20 |

(Continued)

*Primary Examiner* — William G Trost, IV
*Assistant Examiner* — Abdelbasst Talioua
(74) *Attorney, Agent, or Firm* — SHOOK, HARDY & BACON L.L.P.

(57) ABSTRACT

Computerized systems and methods are provided that utilize a machine learning model to predict anomalies for a radio access network site device and taking corrective action. After a radio access network site device has received a software update, key performance indicators are extracted from the data from the radio access network site device. The key performance indicators are utilized with an anomaly risk model to determine if one or more of the key performance indicators exceeds a baseline threshold for the one or more radio access network devices. Responsive to the one or more key performance indicators exceeding a baseline threshold, a corrective action is initiated modifying the one or more radio access network devices.

19 Claims, 9 Drawing Sheets

(56) References Cited

U.S. PATENT DOCUMENTS

| | | | |
|---|---|---|---|
| 2019/0294528 A1* | 9/2019 | Avisror | G06F 11/3698 |
| 2019/0394659 A1* | 12/2019 | Wang | H04W 24/04 |
| 2020/0084087 A1* | 3/2020 | Sharma | H04W 24/08 |
| 2021/0022016 A1* | 1/2021 | Lee | H04W 36/0058 |
| 2021/0092708 A1* | 3/2021 | Ryu | H04W 76/27 |
| 2021/0144530 A1* | 5/2021 | Zhang | H04L 41/0894 |
| 2021/0241130 A1* | 8/2021 | Zaslavsky | G06N 20/00 |
| 2022/0038163 A1* | 2/2022 | Va | H04B 7/0456 |
| 2022/0330117 A1* | 10/2022 | Li | H04W 36/06 |
| 2023/0275799 A1* | 8/2023 | Boldt | H04L 41/0654 |
| | | | 709/224 |
| 2024/0031444 A1* | 1/2024 | Simon | G06F 8/61 |
| 2024/0152820 A1* | 5/2024 | Singh | H04W 24/02 |
| 2024/0171468 A1* | 5/2024 | Jain | H04L 41/22 |
| 2024/0172112 A1* | 5/2024 | Zhu | H04L 5/0091 |

* cited by examiner

| THRESHOLD | SCORE |
|---|---|
| ANOMALY | 0.5 |
| NO ANOMALY | 0.49 |

Generate Ericsson 5G Dataset

To generate a dataset that can be used to model site degradation based on software update history, we need to connect to two data sources: SQL Server for software version information and ADX for KPIs.

Then, we query both sources for the respective data that we need. Finally, we tidy up the data and merge the two tables on site identifier and save the file for future analysis and modeling efforts.

Import Libraries

```
# General
import json
import pandas as pd
pd.set_option('display.max_rows', None)
import numpy as np

# Server connection
# SQL Server connection
import pyodbc

# Kusto connection
from azure.kusto.data import KustoClient, KustoConnectionStringBuilder
from azure.kusto.data.exceptions import KustoServiceError
from azure.kusto.data.helper import dataframe_from_result_table from azureml.core import Workspace, Dataset
```

Establish SQL Server Connection

```
# Connection properties
with open('swvs_sqlsvr_cred.json') as f:
    data = json.load(f)
    server = data['server']
    username = data['username']
    password = data['password']

conn_string = 'DRIVER={ODBC Driver 13 for SQL Server};SERVER='+server+';UID='+username+';PWD='+password
swvs_nssql_conn = pyodbc.connect(conn_string)
```

Establish Kusto Connection

```
# Connection properties
with open('kpi_kusto_cred.json') as f:
    data = json.load(f)
    AAD_TENANT_ID = data['AAD_TENANT_ID']
    KUSTO_CLUSTER = data['KUSTO_CLUSTER']
    KUSTO_DATABASE = data['KUSTO_DATABASE']

KCSB = KustoConnectionStringBuilder.with_aad_device_authentication(KUSTO_CLUSTER)
KCSB.authority_id = AAD_TENANT_ID
KUSTO_CLIENT = KustoClient(KCSB)
```

Execute SQL Query for Software Data

```
# SQL query
# select Nodename, SwVersion, swversionid,
# [administrativedata.description],
# [administrativedata.productiondate],
# timeofactivation, timeofdeactivation, timeofinstallation
# from [DM_Ericsson_5G].[dbo].[SwVersion] (NOLOCK)
```

FIG. 8

NETWORK DEGRADATION PREDICTION

BACKGROUND

Software modifications and upgrades to radio access network devices, i.e., baseband units (BBU), radio units (RRU) and other equipment, are made regularly to improve network performance. These software upgrades may cause network performance degradation which is tracked via alarms. Furthermore, it can take days or weeks to uncover that a particular alarm is associated with a software upgrade when manually reviewing alarms from multiple databases. At times, when manually reviewing alarms, the association between an alarm and a software update may go undiscovered. Meanwhile, various key performance indicators (KPI) including but not limited to the network speed and signal quality may be degraded. Current technology does not allow for quick and accurate detection of performance anomalies due to a software upgrade or modification of a radio access network equipment.

SUMMARY

Computerized systems and methods are provided for receiving, at a device, data from a radio access network site device. The data comprises one or more key performance indicators for a period of time after an update was made to the radio access network site device. It is determined if the one or more key performance indicators exceed a baseline threshold level for the one or more key performance indicators indicating an anomaly event for the radio access network site device. Responsive to the one or more key performance indicators exceeding a baseline threshold an action is initiated to modify the radio network device. The action may include automatically restarting the radio access network site device or automatically removing the software update made to the radio network site device.

In aspects, a computer system, method and computer readable media are provided for utilizing a machine learning model to predict anomalies for a radio access network site device and taking corrective action. Key performance indicators are extracted from one or more radio access network devices after the one or more radio access network devices has received an update. The key performance indicators from the data are utilized with an anomaly risk model to determine if one or more of the key performance indicators exceeds a baseline threshold for the one or more radio access network devices. Responsive to the one or more key performance indicators exceeding a baseline threshold a corrective action is initiated modifying the one or more radio access network devices.

BRIEF DESCRIPTION OF THE DRAWINGS

Illustrative embodiments of the present invention are described in detail below with reference to the attached drawing figures, and wherein:

FIG. 8 depicts a process for determining KPIs;

DETAILED DESCRIPTION

Figure 1:
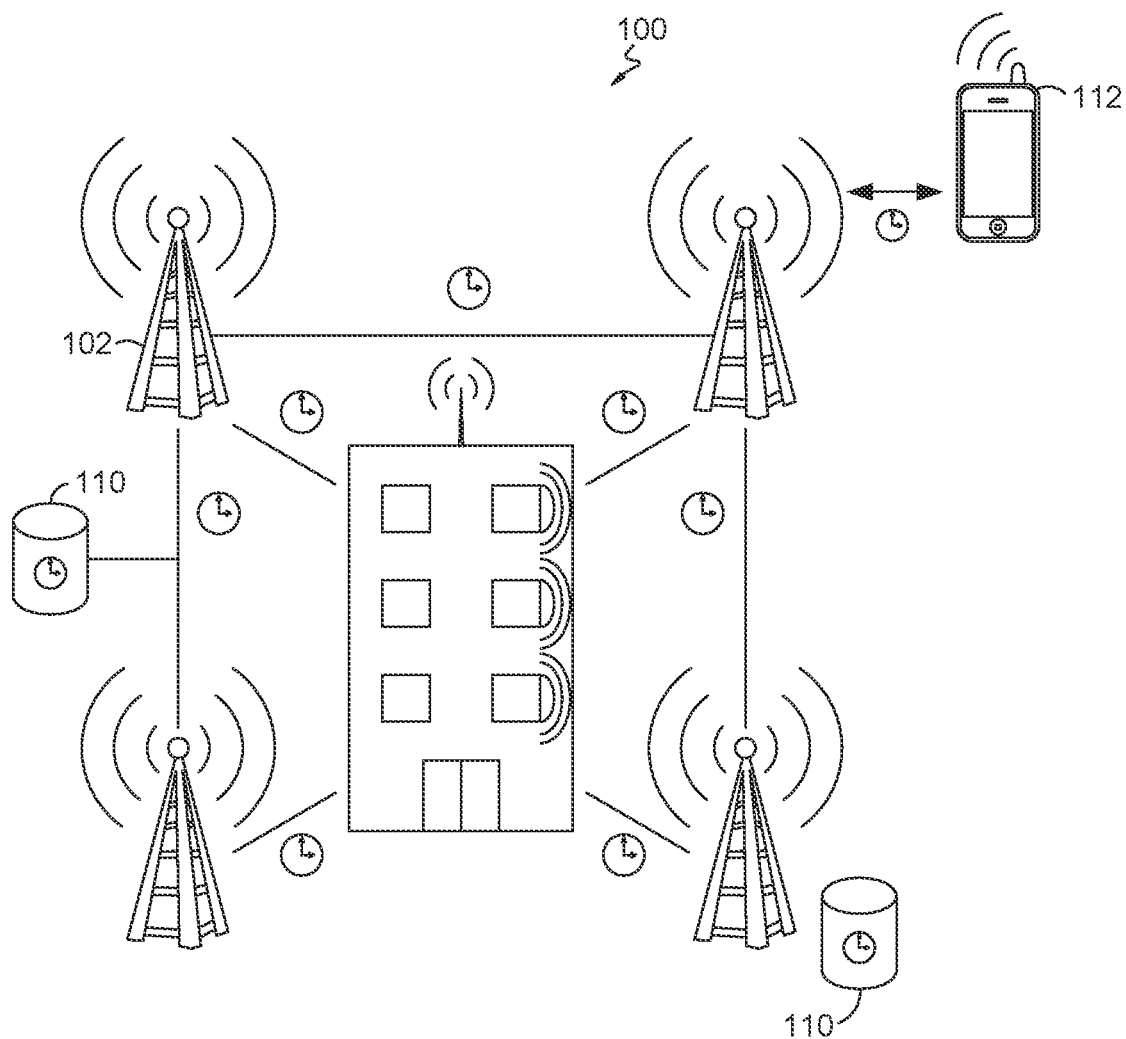
FIG. 1 depicts an exemplary geographically disperse mobile telecommunications network suitable for use in implementing aspects herein.

The subject matter of the present invention is being described with specificity herein to meet statutory requirements. However, the description itself is not intended to limit the scope of this patent. Rather, the inventors have contemplated that the claimed subject matter might also be embodied in other ways, to include different operators or combinations of operators similar to the ones described in this document, in conjunction with other present or future technologies. Terms should not be interpreted as implying any particular order among or between various operators herein disclosed unless and except when the order of individual operators is explicitly described. As such, although the terms "operator" and/or "block" can be used herein to connote different elements of system and/or methods, the terms should not be interpreted as implying any particular order and/or dependencies among or between various components and/or operators herein disclosed unless and except when the order of individual operators is explicitly described. The present disclosure will now be described more fully herein with reference to the accompanying drawings, which may not be drawn to scale and which are not to be construed as limiting. Indeed, the present invention can be embodied in many different forms and should not be construed as limited to the aspects set forth herein. Further, it will be apparent from this Detailed Description the technological solutions disclosed herein are only a portion of those provided by the present invention. As such, the technological problems, solutions, advances, and improvements expressly referenced and explained herein should not be construed in a way that would limit the benefits, improvements, and/or practical application of the discussed aspects of the present invention.

As one skilled in the art will appreciate, embodiments of the invention may be embodied as, among other things: a method, system, or set of instructions embodied on one or more computer readable media. Accordingly, the embodiments may take the form of a hardware embodiment, a software embodiment, or an embodiment combining software and hardware. In one embodiment, the invention takes the form of a computer-program product that includes computer-usable instructions embodied on one or more computer-readable media, as discussed further with respect to FIG. 2.

Embodiments herein provide a technological solution that addresses, solves, and overcomes the technological problems and/or shortcomings found when modifying or upgrading software for radio access network devices in a radio access network. A radio access network is a major component of a wireless telecommunications system that connects individual devices to other parts of a network through a radio link. Typically, a radio access network includes antennas, radios, and radio access network devices as part of a base station that covers a specific region. Antennas convert electrical signals into radio waves and radios transform digital information into signals that can be sent wirelessly. Radios ensure that transmissions are in the correct frequency bands with the right power levels.

Radio access network devices are typically a combination of one or more computer processing devices and software code to enable wireless communication. In some implementations, radio access network devices are baseband units (BBU). Radio access network devices provide a set of signal processing functions that makes wireless communication possible. Radio access network devices process and detect errors, secure the wireless signal, and ensure that wireless resources are used effectively.

The software code of a radio access network device typically requires modifications and upgrades. Implementations herein identify issues that may arise due to a software upgrade or modifications to one or more radio access network devices in a radio access network. Typically, software modifications or upgrades are made to radio access network devices quarterly. In implementations, the software modification or update to a radio access network device is critical. Implementations herein allow for nationwide analysis of updated or modified radio access network devices in different regions to provide insight into a software modification or upgrade issue not seen in some markets.

Accordingly, at a high level, this disclosure describes methods and devices for utilizing key performance indicators (KPI) to determine if there is an anomaly with a radio access network device that has been recently updated. In implementations, the methods and devices initiate an action modifying the radio access network device when an anomaly has been determined. Implementations allow for efficient KPI monitoring, anomaly detection, and modification of the radio access network device. Thus, removing barriers for monitoring software upgrades made to radio access network devices allows for improved signal quality and efficient use of wireless resources.

Accordingly, implementations aim to accurately modify a software update made to a radio access network device. Further, continuous evaluation of KPIs from radio access network devices increases efficiency of the radio access network devices and improves signal quality to user devices. The historical data from radio access network devices may be queried so KPIs can be extracted and input into one or more machine learning models trained to predict the risk of anomalies in one or more radio access network devices. The models may be trained on data from radio access network devices. Prediction enables efficient prediction and detection of anomalies in radio access network devices after a software update. Based on the prediction, a corrective action, such as restarting the radio access network device or removing the software update from the radio access network device is performed.

Further embodiments of the disclosure are directed to training one or more machine learning models to predict anomalies after a radio access network device has had a software update. Training the models may include identifying anomaly risks from reference data for radio access networks and radio access network devices. KPI selection may be performed separately on models such that different KPIs may be used from the reference data set.

A variety of machine learning models may be utilized to determine KPIs that may be associated with issues arising from a software upgrade or modification to one or more radio access network devices. Machine learning anomaly models may include isolation forest and local outlier factor.

Implementations of machine learning models identify KPIs that may be associated with issues arising from a software upgrade or modification to one or more radio access network devices. KPI degradation may occur immediately after a software modification or upgrade or, in some instances, may happen up to two weeks after a software modification or upgrade.

What is needed is an application that monitors KPIs and software upgrades to radio access network devices and then makes adjustments to the radio access network devices when anomalies are predicted and/or detected. In addition to providing anomaly assessment, a performance application provides visibility to engineering, operations, and geographic market teams into anomalies related to software updates. The application allows geographically disperse teams to view and communicate predicted anomalies based on software updates in other markets, which allows for more thorough monitoring of a geographically disperse telecommunications network.

A geographically diverse mobile telecommunications network has hundreds of locations and base stations. Each of these hundreds of data centers have radio access network devices with software that needs updating on a regular basis. An exemplary geographically diverse mobile telecommunications network is described with respect to FIG. 1.

With reference to FIG. 1, an example is depicted illustrating aspects described herein implemented in a communication network 100. Generally, communication network 100 comprises base station(s) 102, database(s) 110, and user device 112. It will be understood by those skilled in the art that a communication network, such as communication network 100, may include an array of devices or components, some of which are not shown so as to not obscure more relevant aspects of the invention. Components such as terminals, links, and nodes (as well as other components) may provide connectivity in some embodiments. In aspects, network 100 is associated with one or more communications provider(s) that provides services to user devices, such as user device 112. For example, network 100 may provide voice and/or data services to user devices or corresponding users that are registered or subscribed to utilize the services provided by a communications provider. Network 100 can be any communication network providing voice and/or data service(s), such as, for example, a 1× circuit voice; a 3G network (e.g., CDMA, CDMA2000, WCDMA, GSM, UMTS); a 4G network (WiMAX, LTE, HSDPA); a 5G network; a 6G network; or the like.

Database 110 may be any type of medium capable of storing information. In some aspects, database 110 comprises at least one instance of a database that is part of a distributed database, such as database 110.

In aspects, base station 102 is a wireless communications station installed at a fixed location, such as a communication tower, as illustrated in FIG. 1. The communication tower may be a structure designed to support one or more antennas for communications and/or broadcasting. In other embodiments, base station 102 is a mobile base station, small cell, mini cell, micro cell, pico cell, and/or a femto cell. The base station 102 may be an eNode B in an LTE telecommunications network and may be used to communicate as part of the wireless communications network. In this way, base station 102 can facilitate wireless communications between user device 112 and other devices, user devices, the Internet, and/or network 100. The base station 102 may include at least radio access network device, such as a BBU, responsible for, among other things, digital baseband signal processing. For instance, CDMA/EVDO and LTE Internet protocol (IP) packets are received from a wireless communications network and are digitally combined by the radio access network device at the base station 102. The blended digital baseband signal is transmitted to a radio at the base station 102. Digital baseband signals received from the radio are demodulated by the radio access network device and the resulting IP packets are transmitted by the radio access network device to the network. The base station 102 may include a radio (not shown) or a remote radio head (RRH) that generally communicates with one or more antennas associated with the base station 102. The base station may support multiple-input-multiple-output (MIMO) and/or time division duplex or any other suitable communication protocols. In some aspects, base station includes a database 110. In some aspects, base station 102 includes a base station clock (device clock) that facilitates time division duplex, MIMO, and/or other communication protocols supported by base station 102 between the base station and one or more user devices, such as user device 112.

User device 112 can communicate with other devices, such as mobile devices, servers, etc. The user device 112 can take on a variety of forms, such as a personal computer; a laptop computer; a tablet; a netbook; a mobile phone; a smart phone; a personal digital assistant; or any other device capable of communicating with other devices by way of a network. Makers of illustrated user devices include, for example, Research in Motion; Creative Technologies Corp.; Samsung; Apple computers; Nokia; Motorola; and the like. A user device 112 may comprise, for example, a display(s); a power source(s) (e.g., a battery); a data store(s); a speaker(s); memory; a buffer(s); and the like. In embodiments, user device 112 comprises a wireless or mobile device with which a wireless telecommunications network(s) can be utilized for communication, e.g., voice and/or data communication. In this regard, the user device 112 can be any mobile computing device that communicates by way of, for example, a 3G, 4G, or 5G network. User device 112 may connect, at least temporarily, to base station 102.

Figure 2:
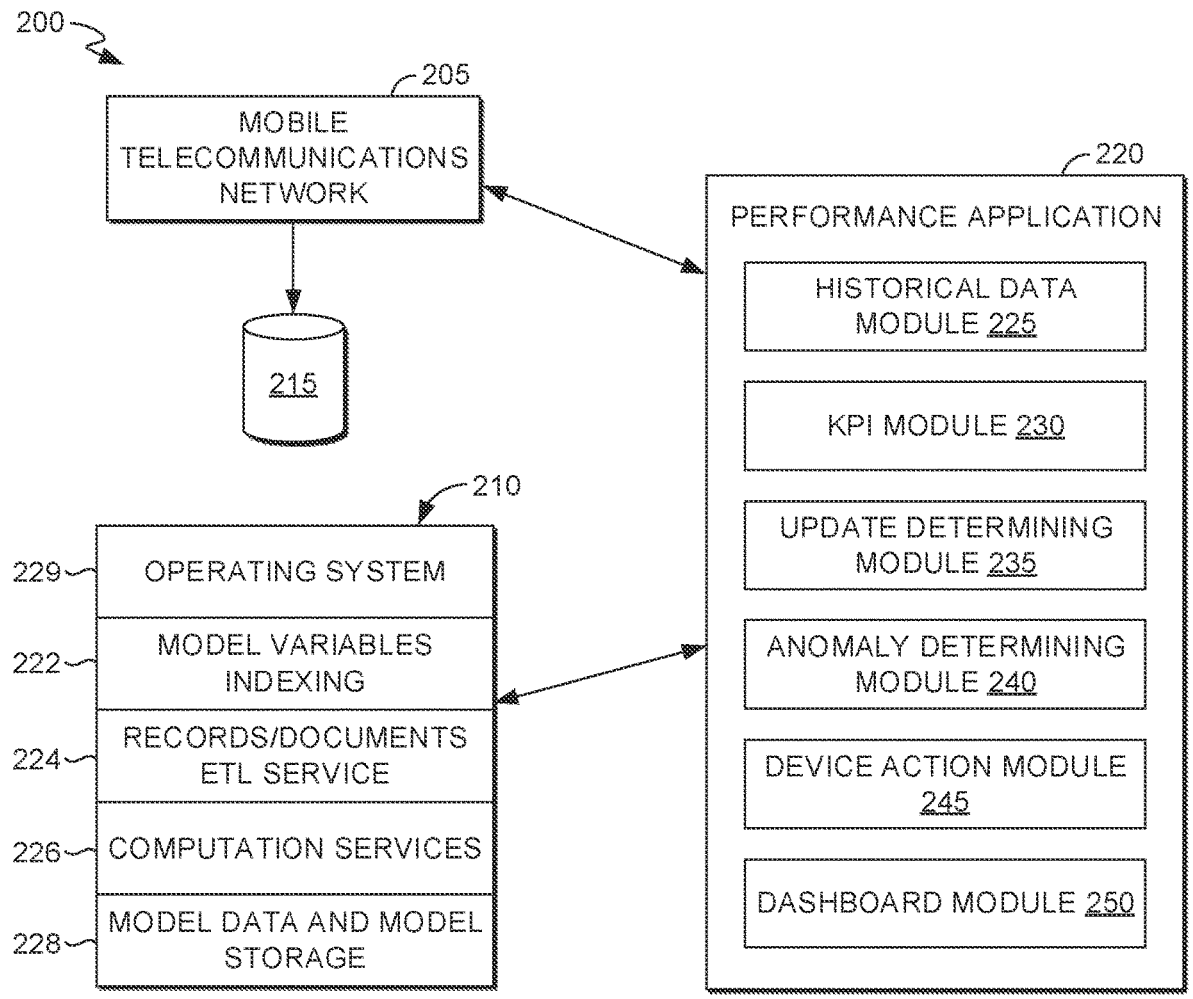
FIG. 2 depicts a computer system suitable for use in implementing aspects herein.

Turning to FIG. 2, an exemplary computing system 200 is depicted. The computing system 200 (hereinafter "system") is merely an example of one suitable computing system and is not intended to suggest any limitation as to the scope of use or functionality of embodiments of the present invention. Neither should the system 200 be interpreted as having any dependency or requirement related to any single module or combination of modules illustrated herein.

In some embodiments, one or more of the illustrated modules may be implemented as a stand-alone application by one or more computing devices. The modules described are exemplary in nature and in number and should not be construed as limiting. Any number of components may be employed to achieve the desired functionality within the scope of the embodiments hereof. Further, modules may be located on any number of computing devices.

In the embodiment shown in FIG. 2, the system 200 includes a network 205, software stack 210, database 215, and performance application 220. Network 205 is the geographically diverse mobile telecommunications network discuss with respect to FIG. 1.

Generally, the performance application 220 is configured to monitor KPIs, software updates, and determine anomalies for radio access network devices in network 205. In this embodiment, the performance application 220 is comprised of machine readable instructions (not shown); historical data module 225; KPI module 230; update determining module 235; anomaly determining module 240; device action module 245; and dashboard module 250. It will be appreciated that any variety of programming languages can be used for performance application 220. Performance application 220 may be comprised of more or fewer modules and any and all variations are contemplated herein. The modules described are exemplary in nature and in number and should not be construed as limited. Any number of modules may be employed to achieve the desired functionality within the scope of the embodiments hereof. Additionally, in some aspects, the application 220 may also be located within the database 215. It is also contemplated application 220 may be integrated with software stack 210.

Historical data module 225 collects historical data from the mobile telecommunications network 205 and related databases to be analyzed by stack 210 for machine learning to determine KPIs to be monitored in a radio access network. Historical data may include service tickets, data from radio access network devices, and data regarding the version of software and date of upgrade of one or more radio access network device(s).

In implementations, service tickets may include issues identified by engineers or clients and may be documented as tickets or help requests. Data for tickets may include a problem and location identifying information, such as geographic region, market, and base station. Natural language processing may be applied to ticket descriptions to determine if issues are related to software upgrades or modifications.

Data from radio access network devices may include alarms, heartbeat testing data, and other related data. In implementations, alarms indicate a device is not taking traffic or is down. Heartbeat testing data sends a data packet to an IP address site and monitors if the data packet is returned. If the packet is returned, it indicates the radio access network device is working. If it is not returned, it indicates the radio access network device is down. The version of software of radio access network device(s) may be obtained from a database tracking hardware and associated software upgrades and includes identification of the radio access network device, and version and date of the latest software upgrade for each radio access network device.

Historical data module 225 adds historical data, collected by location, into model data and model storage 228 to be analyzed with machine learning. Stack 210 applies machine learning to the historical data to determine relevant KPIs and baselines for the relevant KPIs to monitor when software has been upgraded.

Software stack 210, in some embodiments, operates in the cloud as a distributed system on a virtualization layer utilizing distributed computer devices, and includes operating system 229. Operating system 229 may be implemented as a platform in the cloud and is capable of hosting a number of services, such as services 222, 224, 226, and 228, described further herein. Embodiments of services 222, 224, 226, and 228 run as a local or distributed stack in the cloud, on one or more personal computers or servers and/or performance application 220. In some embodiments, performance application 220 operates in conjunction with software stack 210. In implementations, exemplary services for software stack 210 may include Microsoft Azure Machine Learning Studio, Microsoft SQL Server Management Studio, Microsoft Azure Data Explorer, and Microsoft Kusto.

In embodiments, model variables indexing service 222 provides services that facilitate retrieving frequent item sets, extracting database records, and cleaning the values of variables in records. For example, service 222 may perform functions for indexing or mapping KPIs. In some embodiments, model variables indexing service 222 may invoke computation services 226. Records/documents ETL service 224 is generally responsible for providing one or more models for determining anomalies in an updated radio access network device as described in connection to performance application 220 of FIG. 2 and/or methods 600 and 700 of FIGS. 6 and 7 respectively.

Computation services 226 perform statistical software operations, such as computing the transformed variable predictions, transferred features, such as log and log 1p functions of KPIs as described herein. In an embodiment, computation services 226 and records/documents ETL service 224 include computer software services or computer program routines. Computation services 226 also may include natural language processing services (not shown). In an embodiment, computation services 226 include the services or routines that may be embodied as one or more software agents or computer software routines. Computation services 226 also may include services or routines for using one or more models, including predicting anomalies in random access network devices after a software upgrade.

In some embodiments, stack 210 includes model data and model storage 228. Some embodiments of model data and model storage 228 may comprise a distributed file system and which, in some embodiments, provide access to cloud-based services. Additionally, some embodiments of model data and model storage 228 may comprise one or more stream processing services (not shown) which may include the use of multiple such stream processing services in parallel, serially, or operating independently.

Model data and model storage 228 which, in some embodiments, may include raw and processed data from one or more mobile telecommunications network and radio access network devices; an operational data store, which stores events, frequent itemsets (such as "X often happens with Y", for example) and itemsets index information; association rulebases; agent libraries, solvers, and solver libraries; and other similar information, including data and computer-usable instructions, for example. It is contemplated the term "data" used herein includes any information that can be stored in a computer storage device or system, such as user-derived data, computer usable instructions, software applications, or other information. In some embodiments, model data and model storage 228 comprises data store(s) associated with mobile communication network 205. Further, although depicted as a single storage store, storage 228 may comprise one or more data stores, or may be in the cloud.

Historical data module 225 collects historical data for the radio access network from a variety of databases, including databases searchable by structured query language (SQL) and databases searchable by kusto query language (KQL). In implementations, for databases searchable by SQL, the data is loaded to Microsoft SQL Server Management Studio and mirrored in Microsoft Azure Data Explorer and then queried and analyzed by Microsoft Azure Machine Learning Studio. For example, historical databases searchable by SQL and databases searchable by KQL are uploaded to perform machine learning. In implementations, the data from each type of database is merged to be utilized with machine learning. In implementations, the database is merged in Microsoft Azure Data Explorer or other machine learning notebook. The merged database may be Kusto queried to be utilized with Microsoft Azure Machine Learning Studio to collect historical data to determine KPIs.

Software stack 210 utilizes the historical data to determine KPIs and baselines for the KPIs for one or more radio access network devices using machine learning. In implementations, the KPIs and baselines are solved as a classification problem, using algorithms such as binary class or random forest. Baselines may be determined by machine learning by determining the baseline KPIs for one or more radio access network devices before receiving a software upgrade. In implementations, the KPIs identified may include but not limited to call throughput, cell availability, speed of connection, number of call drops, and signal quality of calls. As new data becomes available, it may be added to the historical data for updating KPIs and their baselines.

Once KPIs and baselines are determined by machine learning of stack 210, KPI module 230 monitors data from and related to radio access network devices for the KPIs. In implementations, KPI module 230 continuously monitors KPIs for radio access network devices. In other implementations, KPI module 230 begins monitoring KPIs for one or more radio access network devices when notified by update determining module 235 that one or more radio access network devices have received a software update.

Update determining module 235 tracks when one or more radio access network devices had a software update. In implementations, radio access network devices are updated quarterly with a general availability software update. Update determining module 235 tracks the identification and location of radio access network devices. In some implementations, update determining module 235 collects this information from a data store 215 to determine when a new software version is rolled out to one or more radio access network devices on a market or national level.

Figures 4, 5:
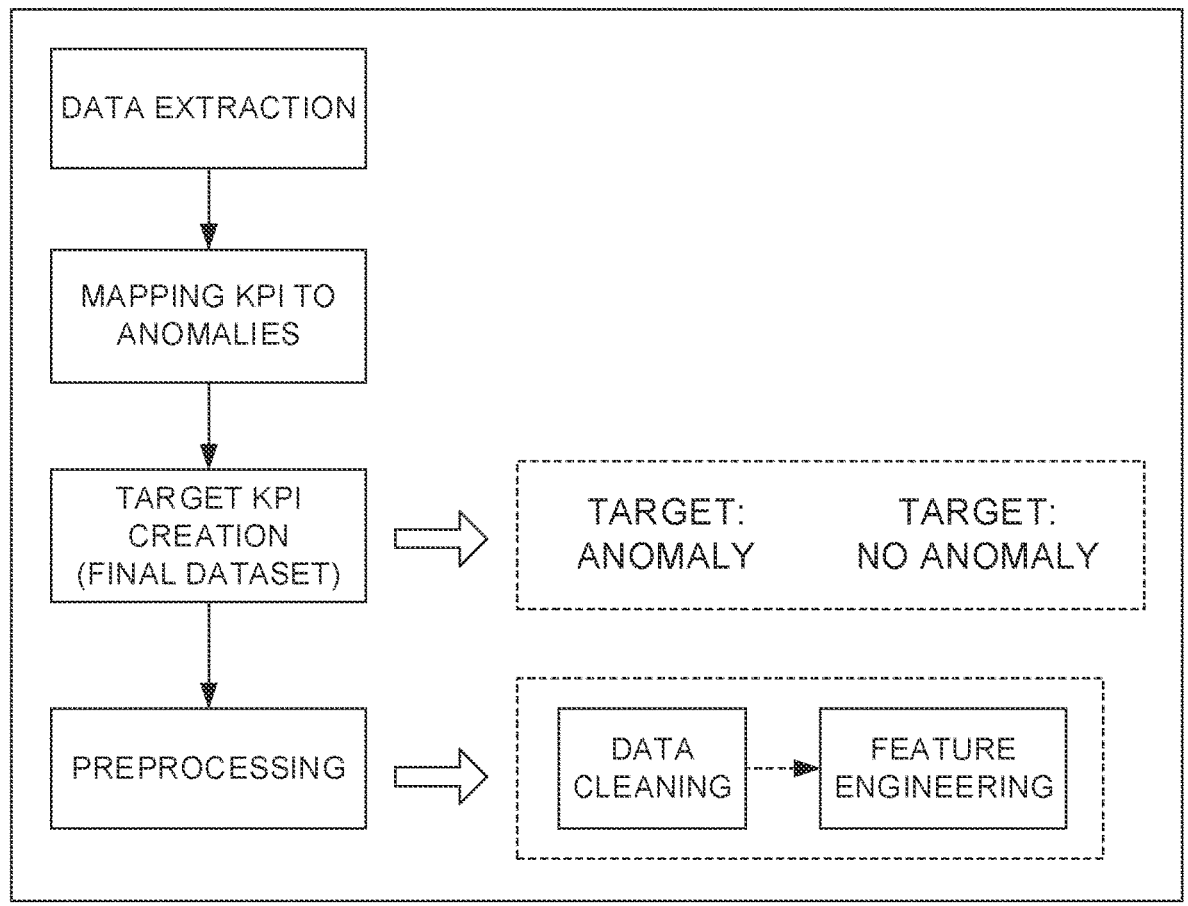
FIG. 4 depicts of flow diagram of an anomaly prediction model development in accordance with an embodiment of the disclosure.
FIG. 5 depicts prediction thresholds in accordance with an embodiment of the disclosure.

Anomaly determining module 240 compares KPI data collected by KPI module to the baseline threshold for the KPI as determined by the machine learning model of stack 210. In implementations, anomaly determining module 240 compares the KPI data collected to the baseline threshold of the KPIs starting when a radio access network device has been updated per update determining module 235. When KPI data for one or more network devices exceeds a threshold, an anomaly is detected for one or more radio access network devices. Utilizing the KPIs and baseline thresholds determined by machine learning, the anomaly determining module 240 determines the likelihood of the network side having KPI problems or degradation in performance because of a network equipment software upgrade. In implementations, the KPI data is compared to a baseline to determine if it exceeds a baseline threshold as shown in FIG. 5. In implementations, if the baseline for one or more KPIs exceeds a threshold, in this instance 0.5, an anomaly is determined by anomaly determining module 240.

In implementations, anomaly determining module 240 utilizes the baseline KPI for the radio access network device that received the upgrade. In other implementations, anomaly determining module 240 compares the KPI data from the upgraded radio access network device to a general baseline determined by machine learning performed for multiple radio access network devices. In other implementations, anomaly determining module 240 compares the KPI data from the upgraded radio access network device to a baseline of a radio access network device that has not yet received a software upgrade.

Device action module 245 initiates an action on the radio access network device determined by anomaly determining module 240 to have one or more anomalies. When anomaly determining module 240 determines that one or more KPIs for the one or more radio access network devices has exceeded a baseline threshold, an action is initiated by device action module 245. In implementations, the action includes rebooting or resetting the radio access network device, verifying parameters for the KPIs, removing the software update and loading the previous version of the software, and generating action items for market engineers to perform to resolve the anomaly.

In implementations, device action module 245 automatically restarts the radio access network device determined to have an anomaly. In implementations, restarting the radio access network device clears any processes that may be stalled at the radio access network device. In implementations, device action module 245 automatically downgrades the radio access network device determined to have an anomaly to the previous version of the software. In implementations, this action can also be utilized to determine if the anomaly determined was the cause of the one or more KPIs exceeding the baseline threshold. If the anomaly and baseline KPIs resolve after downgrading the software to the previous version, this confirms an issue with the software upgrade.

In implementations, device action module 245 stores the detection of the anomaly in a database 215 that is accessible throughout the organization such that other market teams can view and utilize the detection of the anomaly when upgrading radio access network devices in their markets. In implementations, device action module 245 stores the confirmation of the issue with the software upgrade to the database 215 accessible throughout the organization.

In implementations, device action module 245 generates and communicates action items to be executed on the radio access network device determined to have an anomaly via dashboard module 250. Examples of action items to be executed by a network engineer may include reset the base station, rollback software to the previous version, perform additional tests to verify network performance, check network KPIs for any abnormal performance. In implementations, dashboard module 250 generates and communicates the action items to a software engineer via a graphical user interface and stores the action items for further reference in database 215.

Figure 3:
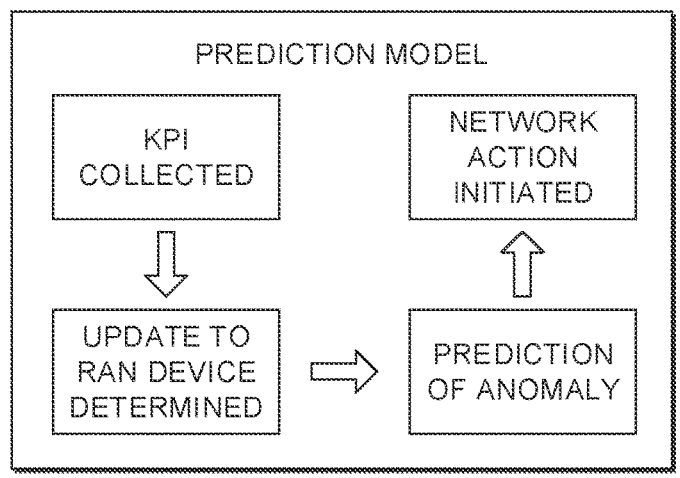
FIG. 3 depicts the anomaly prediction model for updated devices according to embodiments of the disclosure.

With reference to FIG. 3, an exemplary implementation of a high-level methodology for solving the problem of determining anomalies in radio access network devices after a software update is shown. The anomaly risk is solved as a classification problem that prepares data for the anomaly model. A classification problem organizes and formats the data. This step involves knowing the data source and development platform, data creation, data cleaning, and data transformation followed by feature engineering. Both binary and multi-class classification was used in various stages of the machine learning pipeline. Further, a sequential process was followed as shown in FIG. 4.

To develop the anomaly model, historical radio access network device data is provided, then converted. The data is mapped to a radio access network device location. Standard input features or dependent variables are created for capturing the various factors software updates of radio access network devices. A set of KPIs that capture the most meaningful information about radio access network device performance and updating are chosen for the feature selection. In implementations, the optimal combination of parameters is selected using hyperparameter tuning to minimize the loss function and train the model with the best performance. The anomaly risk model is trained using an algorithm with the final set of KPIs.

As shown in FIG. 4, aspects of the present invention relate to an anomaly risk model for predicting the likelihood of an anomaly in a radio access network device that has been recently received a software update. Data for historical performance for one or more radio access network devices before and after software updates is mapped such that trends and patterns can be extracted. Patterns include the typical performance of call throughput, cell availability, speed of connection, number of call drops, and signal quality of calls for one or more radio access network devices. This information is used to refine the machine learning algorithm.

With reference to FIG. 4, the anomaly model is trained with the final set of KPIs for each model. Data is prepared for anomaly model. A classification project organizes and formats the data. This step involves knowing the data source and development platform, data creation, data cleaning, and data transformation and, in some implementations, feature engineering.

The anomaly model is solved as a classification problem. Both binary and multiclass classification was used in various stages of the ML pipeline. Sequential models were built using the hierarchical modeling concept of having a local classifier per parent node and at the end combined using joint probability. The conditional probability of an event B is the probability that the event will occur given the knowledge that an event A has already occurred.

To get a better sense of how this model could be used in a real-world scenario, thresholds are provided based on the model performance. If the model were used with the exemplary threshold of FIG. 5, episodes below that threshold are identified as "low risk" and all those above the threshold are identified as "high risk". FIG. 5 describes exemplary thresholds based on predictability score. The anomaly model is deployed in a machine learning environment. It will be appreciated that any machine learning environment a cloud hosted environment may be utilized. The model is consumed by the performance application via an application programming interface (API).

Figure 6:
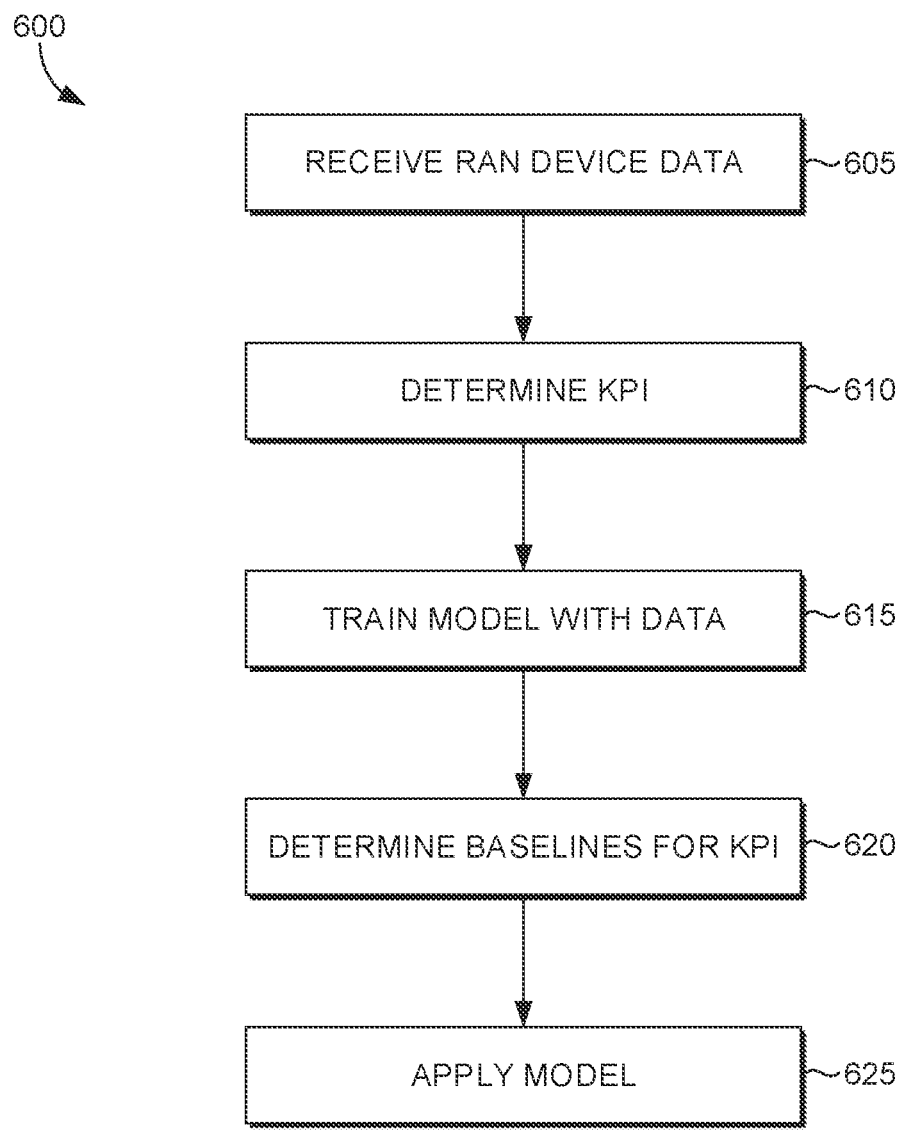
FIG. 6 depicts a flow diagram for training an anomaly prediction model in accordance with an embodiment of the disclosure.

With reference to FIG. 6, a method, system, and computer-readable media 600 are provided depicting a process for determining anomalies on one or more radio access network devices that have received software updates. At 605, radio access network device data is received by the historical data module 225 of performance application 220. In implementations, the historical data is extracted from a mobile communications network. A database 215 of historical network data may also be accessed for the historical data. At 610, the historical data is separated into KPIs that capture the most meaningful information the radio access network device and performance of the one or more radio access network devices and the network. At 615, the anomaly model is trained with the KPIs determined at 610. At 620, using machine learning, the baseline performance for the one or more KPIs is determined.

Figure 9:
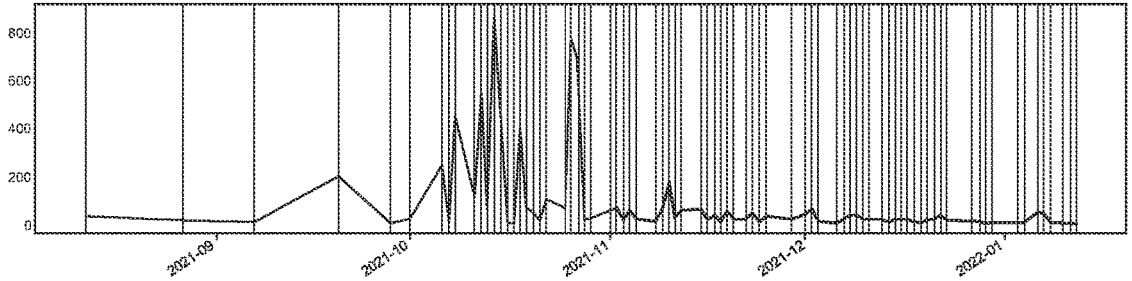
FIGS. 9 and 10 depict processes for utilizing KPIs to determine anomalies for one or more updated RAN devices.
Figure 10:
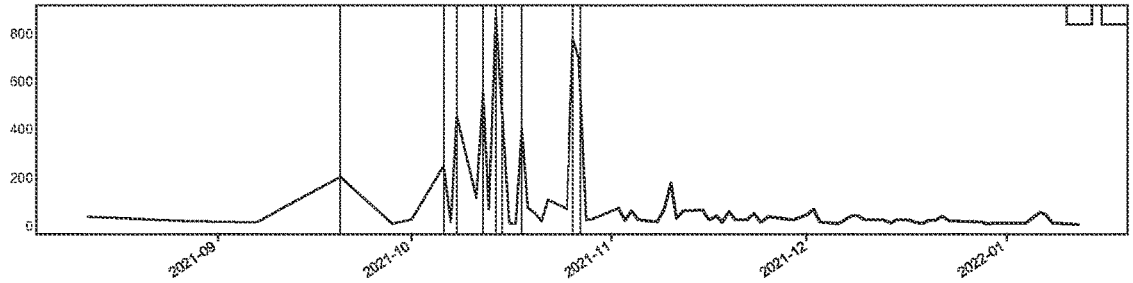

In an exemplary implementation, with reference to FIG. 8, machine learning determines that the "cell availability rate" is a KPI. In FIGS. 9 and 10, the historical data for the cell availability rate KPI after a time of activation of a software update to one or more radio access network devices is analyzed by machine learning to determine the baseline for a cell availability rate KPI. In this implementation, the baseline for cell availability rate is determined to have around 400 cell phones that are unavailable. The baseline for cell availability rate KIP is exceeded and one or more anomalies are detected when more than 400 cell phones are unavailable. At 625, the KPIs and baselines determined by the model can be applied to near real-time data received from a mobile telecommunications network as described in FIG. 7.

Figure 7:
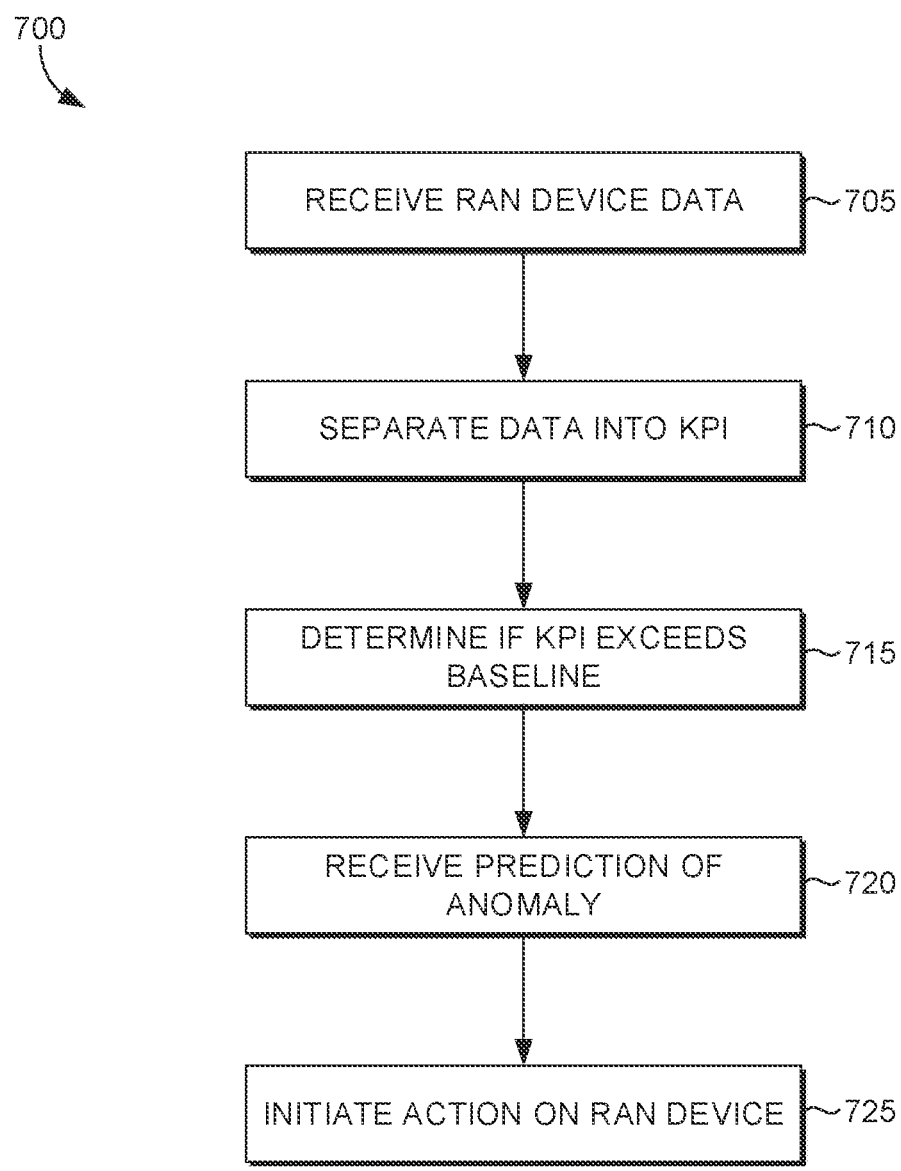
FIG. 7 depicts a flow diagram of a method for initiating an action on an updated RAN device in accordance with an embodiment of the disclosure.

With reference to FIG. 7 a method, system, and computer-readable media 700 are provided depicting a process for predicting anomalies on updated radio access network devices and initiating actions to correct the anomalies. At 705, near real-time data is received from a telecommunications network. In implementations, the data is device data from one or more radio access network devices for the time period after a software upgrade has occurred for the one or more radio access network devices. At 710, the data is separated into KPIs determined by the machine learning model.

At 715, the KPIs are processed at 715 to determine if one or more KPIs exceed the baseline for the KPI. If one or more KPIs exceed the baseline threshold, at 720, an anomaly is predicted for the one or more radio access network devices having a KPI that exceeds the baseline threshold after having the software upgraded. At 725, an action is initiated for the one or more radio access network devices that have a KPI that exceeds the baseline threshold. In implementations, the actions may include automatically restarting the one or more radio access network devices or automatically downgrading the previous version of software.

In the exemplary implementation, with reference to FIGS. 9 and 10 utilizing the machine learning model, near real-time data for the cell availability rate is received for one or more radio access network devices after the devices have been updated. The cell availability rate for the one or more updated radio access network devices is compared to the baseline for cell availability rate determined by the machine learning model. The baseline for cell availability rate is continuously monitored for a period of time after the update, up to two weeks. In the exemplary implementation, if the one or more updated radio access network devices exceed the baseline and more than 400 cell phones are unavailable, an anomaly in the one or more radio access network devices is predicted. The performance application 220 then initiates an action for the radio access network device to correct the anomaly.

Figure 11:
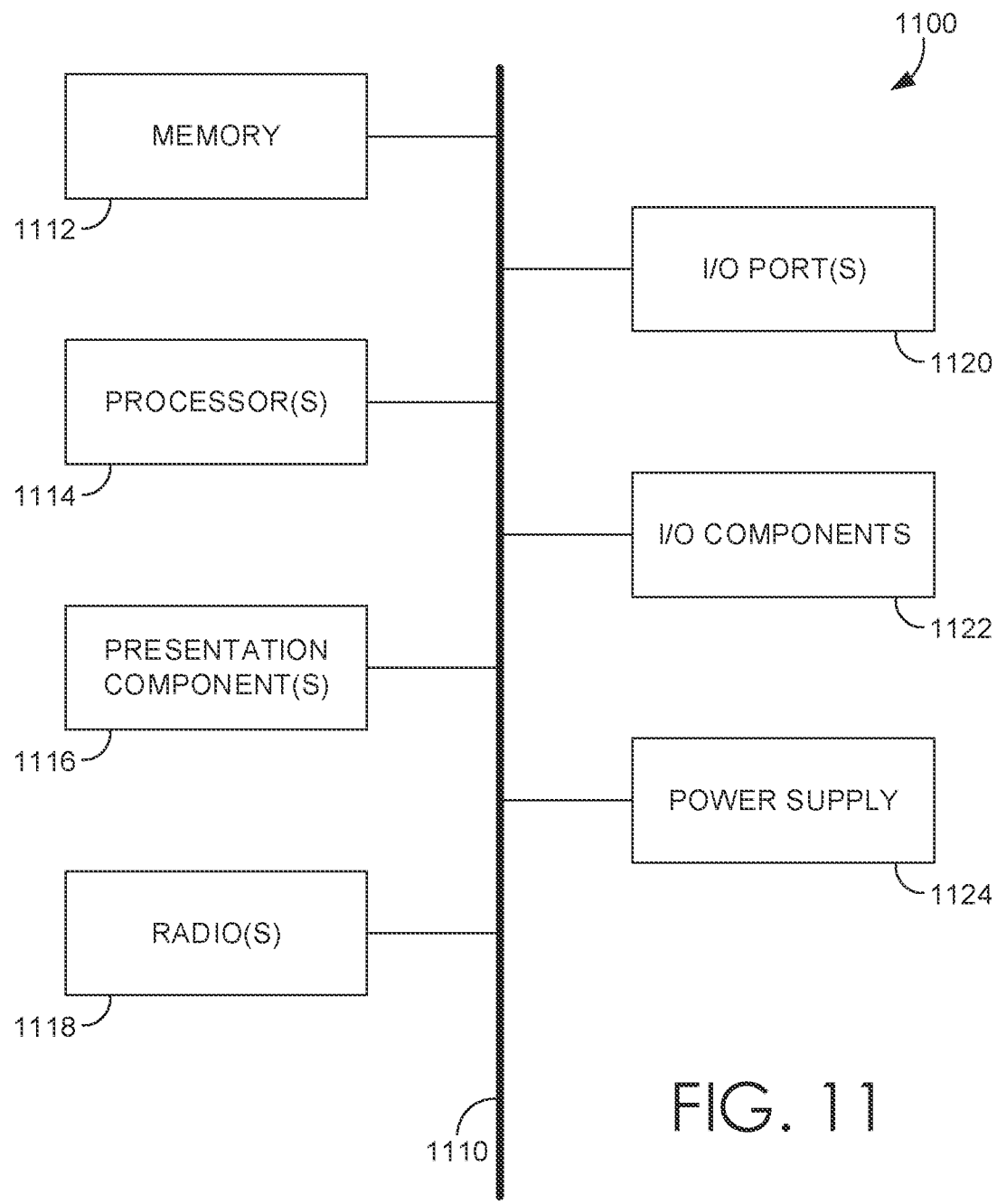
FIG. 11 depicts an exemplary computing device suitable for use in implementing aspects herein.

In FIG. 11, computing device 1110, such as a radio access network device or server, can directly or indirectly couple to the following devices: memory 1112; one or more processors 1114; one or more presentation components 1116; input/output ports 1120; input/output components 1122; illustrative power supply 1124; and one or more radio sources or aspects 1118. The various blocks of FIG. 11 are shown with lines for the sake of conceptual clarity, and other arrangements of the described components and/or component functionality are contemplated. For example, processors have memory. The diagram of FIG. 11 is merely illustrative of an example computing device that can be used in connection with one or more embodiments of the present invention.

Computing device 1110 typically includes a variety of computer-readable media. Computer-readable media can be any available media that can be accessed by computing device 1110 and includes both volatile and nonvolatile, removable and non-removable media. By way of example, and not limitation, computer-readable media may comprise computer storage media and communication media. Computer storage media excludes signals, per se. Computer storage media include volatile and nonvolatile, removable and non-removable media implemented in any method or technology for storage of information, such as computer-readable instructions, data structures, program modules, or other data. Computer storage media includes, but is not limited to, RAM; ROM; EEPROM; flash memory or other memory technology; CD-ROM; digital versatile disks (DVD); other optical disk storage, magnetic cassettes, magnetic tape, magnetic disk storage, or other magnetic storage devices; or any other medium which can be used to store the desired information and which can be accessed by computing device 1110.

Memory 1112 includes computer storage media in the form of volatile and/or nonvolatile memory. The memory may be removable, non-removable, or a combination thereof. Exemplary hardware devices include solid-state memory, hard drives, optical-disc drives, etc. Computing device 1110 includes one or more processors that read data from various entities, such as memory 1112 or I/O components 1122. Presentation component(s) 1116 may present data indications to a user or other device. Exemplary presentation components include a display device, speaker, printing component, vibrating component, etc. I/O ports 1120 allow computing device 1110 to be logically coupled to other devices, including I/O components 1122, some of which may be built in. Illustrative components include a microphone, joystick, game pad, satellite dish, scanner, printer, wireless device, etc.

With reference to the technical solution environment described herein, embodiments described herein support the technical solution described herein. The components of the technical solution environment can be integrated components that include a hardware architecture and a software framework that support constraint computing and/or constraint querying functionality within a technical solution system. The hardware architecture refers to physical components and interrelationships thereof, and the software framework refers to software providing functionality that can be implemented with hardware embodied on a device.

The end-to-end software-based system can operate within the system components to operate computer hardware to provide system functionality. At a low level, hardware processors execute instructions selected from a machine language (also referred to as machine code or native) instruction set for a given processor. The processor recognizes the native instructions and performs corresponding low-level functions relating, for example, to logic, control, and memory operations. Low-level software written in machine code can provide more complex functionality to higher levels of software. As used herein, computer-executable instructions include any software, including low level software written in machine code; higher level software, such as application software; and any combination thereof. In this regard, the system components can manage resources and provide services for system functionality. Any other variations and combinations thereof are contemplated with embodiments of the present invention.

Many different arrangements of the various components depicted, as well as components not shown, are possible without departing from the scope of the claims below. Embodiments of this technology have been described with the intent to be illustrative rather than restrictive. Alternative embodiments will become apparent to readers of this disclosure after and because of reading it. Alternative means of implementing the aforementioned can be completed without departing from the scope of the claims below.

What is claimed is:

1. A method in a computing system, the method comprising:
   determining, at a device, that a modification was made to a software code of a radio access network (RAN) site device;
   subsequent to the determining that the modification was made to the software code, receiving, at the device, data from the RAN site device that is a component of a base station associated with a telecommunication network, the data comprising one or more key performance indicators (KPIs) monitored for a predetermined period after the modification was made to the software code of the RAN site device;
   utilizing a machine learning-based anomaly risk model trained on historical KPI data from multiple geographically distributed RAN devices to determine if the one or more KPIs exceed a dynamically adjusted baseline threshold for the one or more KPIs, wherein the dynamically adjusted baseline threshold is determined based on a comparative analysis of performance deviations in similar network environments;
   predicting, prior to a service-impacting failure, an anomaly event for the RAN site device based on a deviation of KPIs exceeding the dynamically adjusted baseline threshold; and
   responsive to the one or more KPIs exceeding the dynamically adjusted baseline threshold, automatically initiating, at the device, an adaptive corrective action modifying the RAN site device prior to full network degradation.

2. The method of claim 1, wherein the adaptive corrective action comprises restarting the RAN site device.

3. The method of claim 1, wherein the adaptive corrective action comprises removing a software update made to the RAN site device.

4. The method of claim 1, wherein the one or more KPIs comprise call throughput, cell availability, calls dropped, or signal quality.

5. The method of claim 1, wherein the one or more KPIs comprise one or more of call throughput, cell availability, drop rate, signal quality, and latency metrics.

6. The method of claim 1, wherein the machine learning model is a binary classification model that is updated dynamically using a learning approach that incorporates anonymized KPI data from multiple network operators to improve predictive accuracy.

7. The method of claim 6, wherein the binary classification is random forest.

8. A method in a computing system, comprising:
   determining, at a device, that a software modification was made to a software code of one or more radio access network (RAN) site devices;
   receiving performance data from the one or more RAN devices for a defined period after the software modification, wherein the one or more RAN devices are components of one or more base stations associated with a telecommunication network;
   extracting, at the device, multiple key performance indicators (KPIs) from the received performance data;
   applying a trained machine learning model to analyze deviations in KPIs relative to dynamically generated baseline thresholds, wherein the trained machine learning model is optimized using data from prior software rollouts to predict performance degradation risks;
   detecting an early-stage anomaly prior to complete network degradation based on a deviation of one or more KPIs exceeding a dynamically generated baseline threshold; and
   responsive to the one or more KPIs exceeding the dynamically generated baseline threshold, initiating a proactive correction, comprising at least one of: downgrading the one or more RAN devices to a prior stable software version, selectively reverting configuration settings for impacted regions, triggering an automated diagnostic sequence to isolate fault conditions, or executing a multi-step mitigation strategy based on a historical effectiveness score of corrective actions applied to similar anomalies.

9. The method of claim 8, wherein determining that an anomaly event has occurred further comprises applying a confidence score model to determine a probability of an anomaly being software-related, and dynamically adjusting a rollback threshold based on confidence score weightings.

10. The method of claim 8, wherein the proactive correction comprises removing a software update made to the one or more radio network site devices.

11. The method of claim 8, wherein the one or more KPIs are call throughput, cell availability, calls dropped, or signal quality.

12. The method of claim 8, wherein corrective action is executed upon confirmation of a performance degradation trend over multiple monitoring cycles.

13. The method of claim 12, wherein the machine learning model is a binary classification.

14. The method of claim 13, wherein the binary classification is random forest.

15. One or more non-transitory computer storage media having computer-executable instructions embodied thereon that, when executed, perform a method comprising:
   determining, at a device, that a modification was made to a software code of one or more radio access network (RAN) site devices;
   subsequent to the determining that the modification was made to the software code, receiving, at the device, key performance indicators (KPIs) from the RAN site device for a period after the modification, wherein the RAN device is a component of a base stations associated with a telecommunication network;
   analyzing the KPIs using a machine learning model trained to detect performance anomalies based on historical network data to determine if one or more KPIs exceed a dynamically adjusted baseline threshold for the KPIs, wherein the dynamically adjusted baseline threshold is determined based on a comparative analysis of performance deviations in similar network environments;
   predicting an anomaly event prior to service degradation based on a deviation of the one or more KPIs exceeding the dynamically adjusted baseline threshold; and
   responsive to the one or more KPIs exceeding the dynamically adjusted baseline threshold, initiating, at the device, an automated corrective action modifying the one or more RAN devices based on the anomaly event prediction.

16. The method of claim 15, wherein the automated corrective action comprises restarting the one or more RAN site devices.

17. The method of claim 15, wherein the automated corrective action comprises removing a software update made to the one or more radio network site devices.

18. The method of claim 15, wherein the one or more KPIs are call throughput, cell availability, calls dropped, or signal quality.

19. The method of claim 15, wherein the machine learning model is a binary classification.

\* \* \* \* \*